(12) United States Patent
Porter et al.

(10) Patent No.: US 6,367,137 B1
(45) Date of Patent: Apr. 9, 2002

(54) SKIVING AND ROLLER BURNISHING TOOL

(75) Inventors: Ronald J. Porter; Krestine Corbin, both of Reno, NV (US)

(73) Assignee: Sierra Machinery, Inc., Sparks, NV (US)

( * ) Notice: Subject to any disclaimer, the term of this patent is extended or adjusted under 35 U.S.C. 154(b) by 0 days.

(21) Appl. No.: 09/573,069

(22) Filed: May 16, 2000

(51) Int. Cl.⁷ .......................... B21C 37/30; B24B 39/00
(52) U.S. Cl. ........................ 29/90.01; 72/122; 407/1; 408/22; 82/1.2
(58) Field of Search ............................. 29/90 R, 90.01; 72/122; 407/1; 408/22, 130; 82/1.2

(56) References Cited

U.S. PATENT DOCUMENTS

| | | | | |
|---|---|---|---|---|
| 3,980,442 A | * | 9/1976 | Riekeles | 29/90 R |
| 4,133,089 A | * | 1/1979 | Heymanns | 29/90 R |
| 4,184,794 A | * | 1/1980 | Henninghaus | 29/90 R |
| 4,367,576 A | * | 1/1983 | Dickinson | 29/90 R |
| 4,505,625 A | * | 3/1985 | Lundvall | |
| 4,527,929 A | * | 7/1985 | Dickinson et al. | 29/90 R |
| 4,574,442 A | * | 3/1986 | Dickinson et al. | 29/90 R |

FOREIGN PATENT DOCUMENTS

EP  0 039 242  * 11/1981

* cited by examiner

Primary Examiner—S. Thomas Hughes
Assistant Examiner—Eric Compton
(74) Attorney, Agent, or Firm—Townsend and Townsend and Crew LLP

(57) ABSTRACT

Apparatus is disclosed for finishing the inside of hollow work-pieces such as long hydraulic or pneumatic cylinders. A rotatable skiving and roller burnishing tool is advanced into one end of the work-piece and advanced through the cylindrical interior of the workpiece. The skiving section is located at the front of the skiving and roller burnishing tool, and the roller burnishing section comprises the rearward section of the tool. The skiving section of the tool has a knife holding portion which holds a skiving knife to skive the interior from a start diameter to a larger, finish diameter. The skiving section also has a plurality of cavities, forward of the knife holding section, which are disposed circumferentially around the skiving section of the tool. A plurality of probe centering location finders are located in the respective cavities. The radial positions of the probe centering location finders are independently adjusted to properly center the skiving and roller burnishing tool as it is advanced through the cylinder.

19 Claims, 4 Drawing Sheets

SECTION A

VIEW B

SKIVING AND ROLLER BURNISHING TOOL

BACKGROUND OF THE INVENTION

The present invention relates to apparatus for finishing the cylindrical interior of long cylindrical tubes, such as those used in hydraulic cylinders.

A hydraulic or pneumatic cylinder is typically roughly formed in a steel mill by drawing a steel blank over a mandrel. As the steel is drawn over the mandrel, particulate matter often becomes embedded in the interior surfaces of the cylinder, and imperfections in the mandrel form corresponding imperfections in the interior of the cylinder. As a result, the interior surfaces of the cylinder must be finished so that the cylinder is usable for hydraulic and pneumatic applications.

Combined skiving and roller burnishing tools, such as that shown in U.S. Pat. No. 4,367,576, are currently available which both cut (skive) the interior of a cylinder to its approximate final diameter, and roller burnish the interior of the cylinder so that it has a smooth finish. Such combined tools conventionally include a skiving tool followed by a plurality of circumferentially spaced rollers in a roller cage. The skiving tool has oppositely disposed knife blades which each produce a helically shaped chip of cut material. The rollers are biased against the cut surface to remove imperfections caused by the skiving process.

Combined skiving and roller burnishing tools have the advantage of cutting and finishing the interior of the cylinder in a single operation, but their use has been found to have certain drawbacks. The skiving and roller burnishing tools described above typically have nylon pads behind the skiving knives and proximate the rollers to stabilize the roller burnishing action of the tool. When attempts have been made to locate such pads in front of the skiving knives, they tend to wear with use, and when worn, often cause chattering of the tool, which ruins the cylinder finish. In addition, the skiving operation creates a helical chip which is directed forwardly out the far end of the tube past the forward portion of the skiving and roller burnishing tool. Coolant flow helps direct the chip out the forward end of the tool. Potential contact between the chip and forwardly located pads has been a significant problem which can destroy a cylinder and sometimes the expensive tool. The use of such nylon pads has thus generally been confined to locations aft of the skiving knife.

While the combined skiving and roller burnishing tools of the type described above are generally functional and provide high quality finished cylinders, their use on very long cylindrical bores can be problematic. It will be appreciated that when cutting and finishing a cylinder, it is desirable that only the cutting tool and the burnishing rollers be in contact with the interior cylindrical wall. Contact between any other portions of the tool and the cylindrical wall can scratch or mar the surface which, of course, is undesirable. Such limited contact between the tool and the cylindrical wall can lead to misalignment of the tool, particularly when very long bores are being finished.

The tools are mounted on drive members and the long drive members required for very long bores will not be completely rigid. Any bending in the drive member can cause the knife blade to oscillate or wobble, causing minor undulations in the finished cylindrical wall. While such undulations may be very small, they may often exceed the close tolerances required for critical applications. It would thus be desirable to provide a skiving and roller burnishing tool which will remain axially aligned with the cylinder despite bending in the associated drive member and is capable of finishing relatively long cylindrical bores within very close tolerances.

SUMMARY OF THE INVENTION

The present invention provides apparatus for finishing the inside of hollow work-pieces such as long hydraulic or pneumatic cylinders. A rotatable skiving and roller burnishing tool is advanced into one end of the work-piece and advanced through the cylindrical interior of the work-piece. The skiving section is located at the front of the skiving and roller burnishing tool, and the roller burnishing section comprises the rearward section of the tool. The skiving section of the tool has a knife holding portion which holds a skiving knife to skive the interior from a start diameter to a larger, finish diameter. The skiving section also has a plurality of cavities, forward of the knife holding section, which are disposed circumferentially around the skiving section of the tool. A plurality of probe centering location finders are located in the respective cavities. The radial positions of the probe centering location finders are independently adjusted to properly center the skiving and roller burnishing tool as it is advanced through the cylinder.

The probe centering location finders located in the tool of the skiving and roller burnishing tool are preferably made of aluminum bronze alloy. This alloy is very hard relative to other potential materials, and has been found to hold up relatively well when subjected to the wear caused by the motion of the skiving and roller burnishing tool. The alloy is able to slide against the inside of the tube with a desirable amount of friction, while maintaining its physical integrity despite the heat generated by the rotation of the skiving and roller burnishing tool. The use of this hard alloy allows the placement of the finders in advance of the knife location without excess deterioration, as was the case with nylon spacers attempted in the past. The finders secure the skiving and roller burnishing tool as it progresses further away from the point at which the tool entered the cylinder, allowing the finishing of cylinders over 20 feet long to within tolerances of a few thousandth's of an inch.

The configuration of the probe centering location finders of the preferred embodiment have also been found to be advantageous. Each probe centering location finder of the preferred embodiment has a generally cylindrical outer surface, a sector of which is planar. Each finder in that embodiment has radially disposed threaded aperture, and the tool has lateral threaded apertures intersecting each cavity. Adjustment screws are employed in the radial apertures to set the radial location of each finder relative to the base of the cavity, and securing screws are employed in the lateral apertures to fix the adjusted position of the finders. The planar sector on each finder provides a flat surface on which the securing screw can contact the probe centering location finder and thus hold it in place.

The preferred embodiment of the present invention further provides for a straighter boring of a cylinder by allowing the knife holder to float freely in a radial direction. The knife holder is located within a polygonal aperture in the knife holding section, which extends through the skiving section of the tool. The knife holding section has a corresponding polygonal shape and is allowed to roll on a plurality of roller bearings which are disposed on the inner surfaces of the knife holding section. Allowing the knife holder to move freely, as opposed to securing it in a fixed position to the skiving and roller burnishing tool, allows the knife holder to be self-centering while the tool rotates.

Additionally, this floatation reduces the amount of friction between the knife blade and the inside wall of the tube which allows the knife to follow the bore of the tube more closely.

In conventional skiving and roller burnishing tools, the helical chips created by the knife blades can impede the procession of the skiving and roller burnishing tool if they are not properly removed from the area in which the skiving and roller burnishing tool is operating. In order to remove the chip as efficiently as possible, a coolant is pumped through the tube from the end at which the skiving and roller burnishing tool entered. The coolant is channeled through a pair of longitudinal indentations on opposite sides of the skiving portion of the tool so that the coolant passes over the knife locations. The knife blade is continuously cooled and the chip is continuously pushed forward and away from the knife holding section of the tool.

The preferred embodiment of the present invention provides two frustoconical sections, opening forwardly, at the forward end of the indentations. These sections direct the coolant flow, and act to shape the chips and direct their removal away from the tool. The locations of the multiple probe centering location finders is significant in this process because, if positioned incorrectly, they re-present places at which the chip could get entangled while passing through the front of the tool. By placing a pair of probe centering location finders between the frustoconical sections on either side in the preferred embodiment, and positioning the two probe centering location finders in each pair roughly sixty degrees apart, the chances of the chip being hindered while passing the front portion of the tool are minimized.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE SPECIFIC EMBODIMENTS

Figure 1:
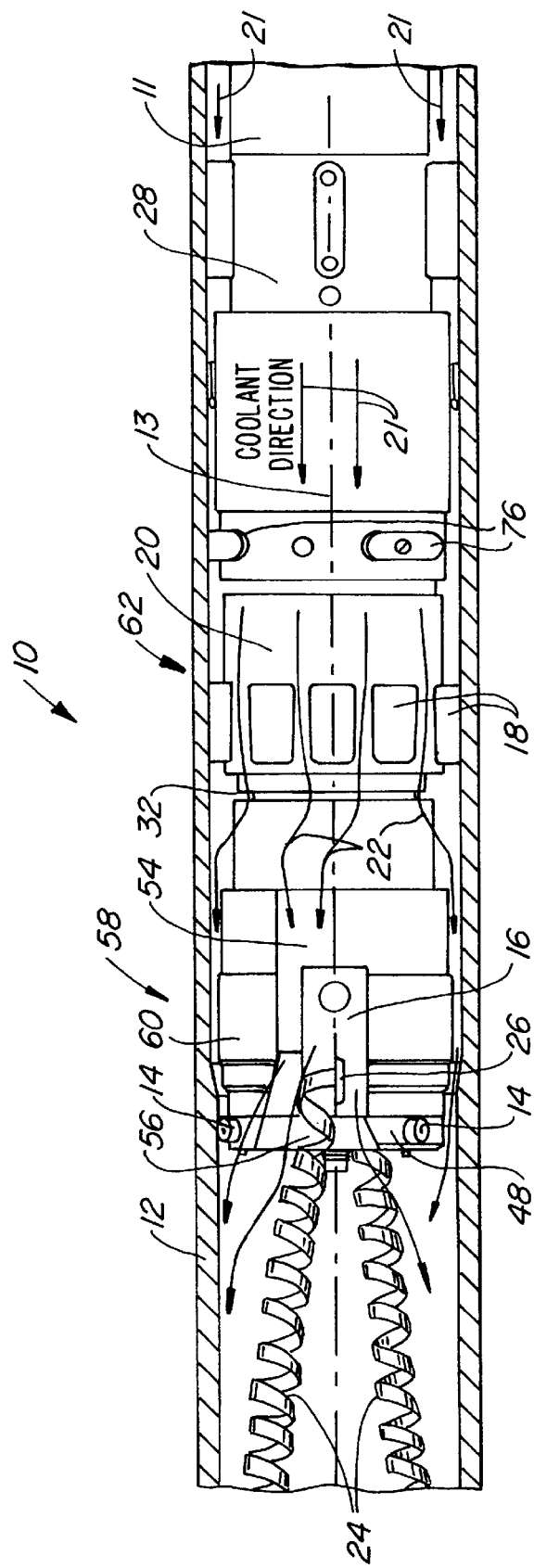
FIG. 1 is a side elevation view illustrating the finishing of a cylinder utilizing the preferred embodiment of the skiving and roller burnishing tool of the present invention.
Figure 2:
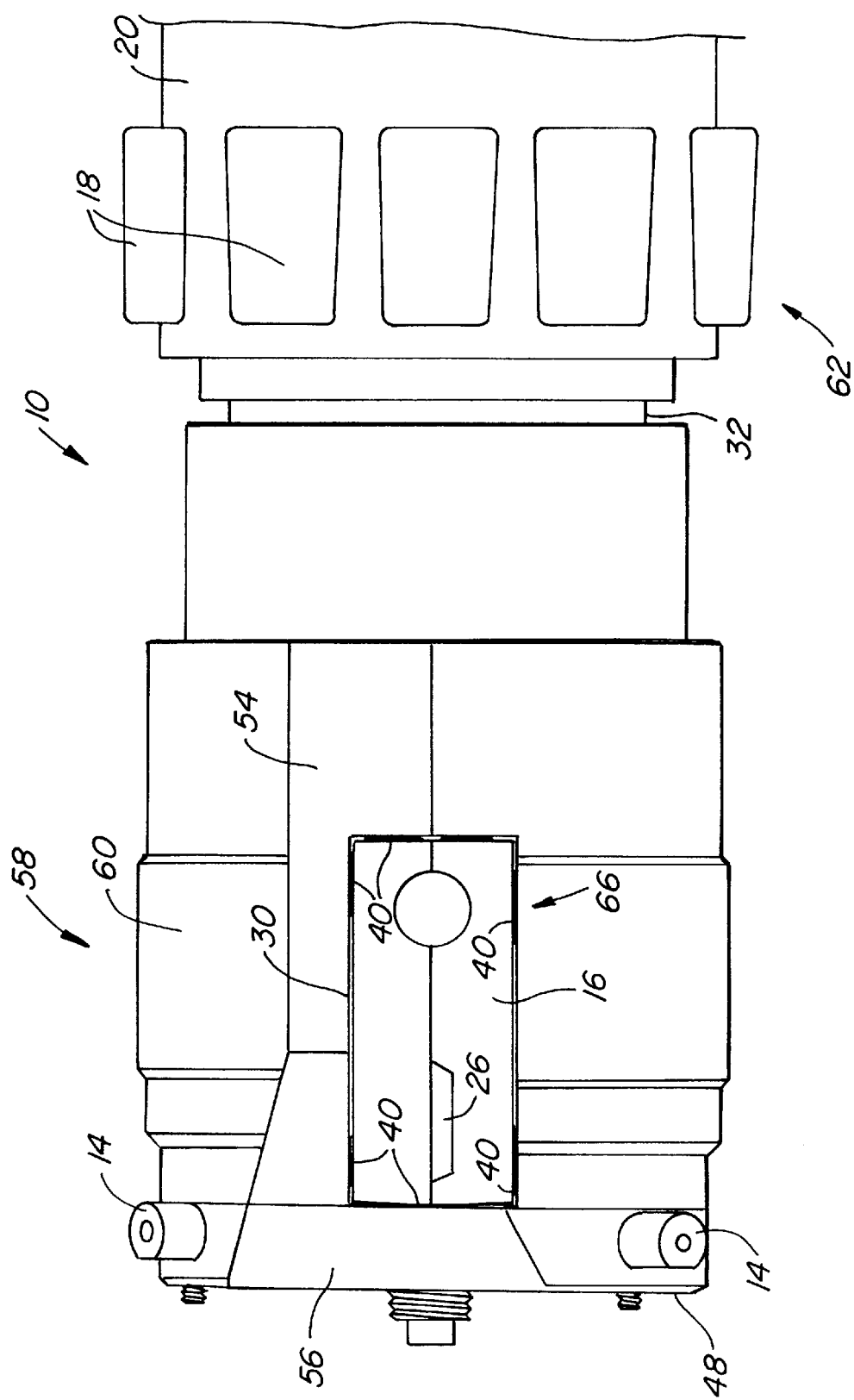
FIG. 2 is a larger scale side elevation view of the preferred embodiment of the skiving and roller burnishing tool of the present invention.

The preferred embodiment 10 of the skiving and roller burnishing tool of the present invention is illustrated generally by way of reference to FIGS. 1 and 2. Tool 10 is mounted on the forward end of a drive member 11 using coupling 28. Drive member 11 rotates and propels the tool through the interior of a cylinder or similar hollow work-piece 12. The tool 10 of the present invention is typically used to finish the cylindrical interior surfaces of large hydraulic or pneumatic cylinders having lengths which may exceed 20 feet.

Tool 10 includes a skiving section 58 located toward the leading end of tool 10 and a roller burnishing section 62 trailing the skiving section, coupled by a preferably flexible joint 32. The skiving section 58 includes a pair of oppositely disposed skiving knife blades 26 in a knife holder 16. As tool 10 is driven through work-piece 12, helical chips 24 are created as knife blades 26 skive the interior of the work-piece. A plurality of burnishing rollers 18 are located in roller race 20, and are biased against the cylindrical interior of the skived work-piece to burnish it smooth and remove imperfections resulting from the skiving process. An example of such a skiving and roller burnishing tool is shown in U. S. Pat. No. 4,367,576. A set of nylon pads 76 aft of the rollers 18 stabilize the roller burnishing action.

An end cap 48 is fixed to the leading end of the skiving section 58 of skiving and roller burnishing tool 10. A plurality of probe centering location finders 14 are disposed on the outer peripheral surface of cap 48 to properly center tool 10 as it is advanced through work-piece 12, as will be discussed in more detail later. Cap 48 further includes two coolant flow and chip extraction frustoconical indentations 56, opening in a forward direction, on opposite sides of cap 48. Indentations 56 align with indentations 54 along the sides of the skiving section 58 of tool 10 adjacent the locations of skiving knives 26.

Coolant is introduced into the interior of work-piece 12 at the upstream end and flows through the work-piece as illustrated by arrows 21 and 22. Skiving section 58 has a portion 60 immediately aft of the location of knife blades 26 which has a larger diameter than the remainder of the skiving section and which closely matches the finish diameter of the skived interior of the work-piece. This larger diameter portion 60 inhibits the flow of coolant past the skiving section 58 of tool 10 except through indentations 54 and 56 proximate knife blades 26.

Turning now to FIGS. 3–7, four probe centering location finders 14 are located within corresponding cavities 50 in the periphery of cap 48. The indentations 56 in cap 48 divide the periphery of the cap into two sections. The cavities 50 and their associated location finders 14 are arranged in the form of two pairs, each pair being in one of the respective sections of cap 48 established by indentations 56. The cavities 50 and location finders 14 in each pair are roughly sixty degrees apart from one another. The location finder 14 and its associated cavity 50 closest to the leading edge of each peripheral section of the cap between indentations 56 as the tool 10 rotates is further from the edge of the nearest indentation than the location finder and cavity nearest the lagging edge of each section. As a result, the helical chips 24 passing through the indentations 56 are much less likely to accidentally catch the nearest location finder 14 and become entangled.

Figure 7:
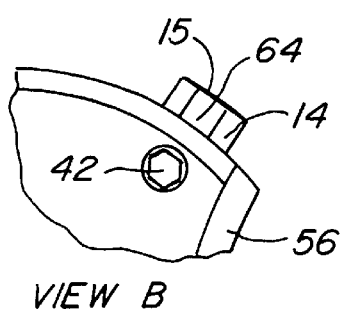
FIG. 7 is a fragmentary view similar to that of FIG. 4 showing one corner of the leading end of the skiving and roller burnishing tool.

Probe centering location finders 14 in the preferred embodiment are manufactured from a hard metallic material such as aluminum bronze alloy. A commercial product sold under the designation AMPCO 20 has been found especially suitable. This material is very hard and resists wear well. The outer surfaces 15 of finders 14 have a curved configuration, as shown in FIG. 7. In combination, the four location finders 14 have a cylindrical outer periphery matched to the start diameter of the work-piece 12 prior to the skiving operation.

Figure 3:
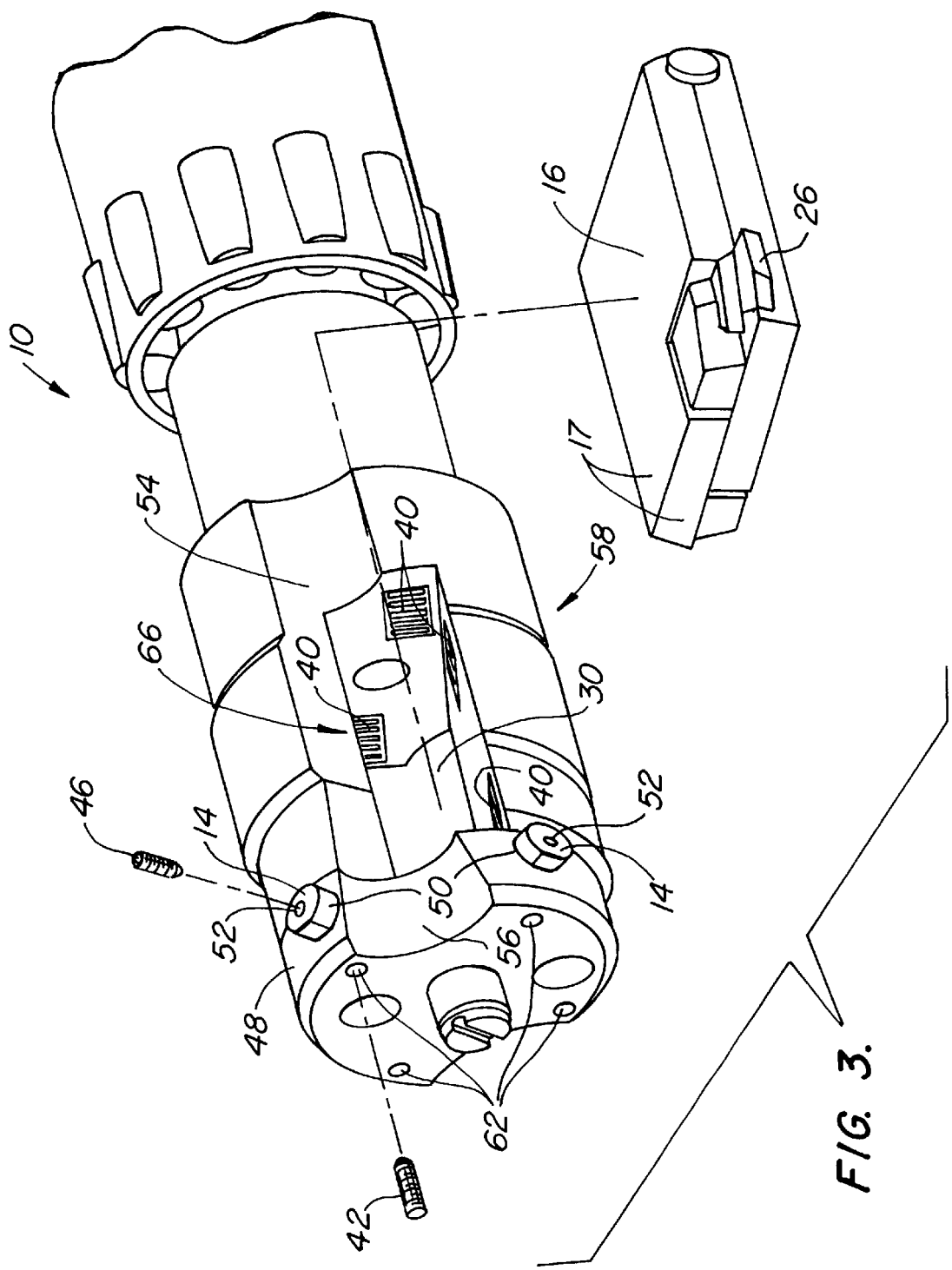
FIG. 3 is an exploded perspective view of the preferred embodiment.
Figure 4:
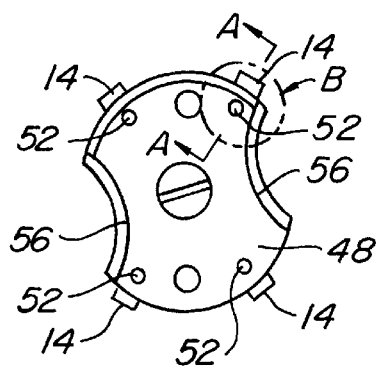
FIG. 4 is a front view of the preferred embodiment of FIG. 1.
Figure 5:
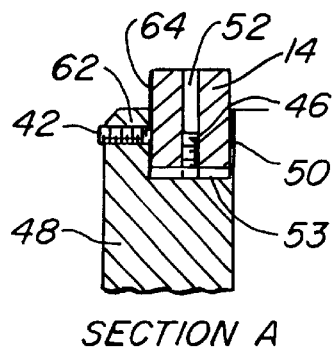
FIG. 5 is a cross-sectional view of the probe centering location finders of FIG. 1 taken along lines A—A of FIG. 4.
Figure 6:
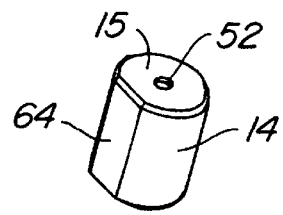
FIG. 6 is an perspective view of the probe centering location finders of FIG. 1.

As shown in FIG. 6, each probe centering location finder 14 has a generally cylindrical configuration with a longitudinal planar sector 64. The probe centering location finders 64 have the same general shape as the plurality of cavities 50 except for the planar sector 64. Each probe centering location finder 14 additionally includes a radially disposed (relative to tool 10) threaded aperture 52. As shown in FIG. 3, adjustment screws 46 are threadably engaged within the respective radially disposed threaded apertures 52 in location finders 14 and bear against the base 53 of the respective cavities 50 to infinitely adjust the radial disposition of the probe centering location finders 14 relative to the centerline 13 of tool 10.

Four longitudinally disposed threaded apertures 62 are formed in cap 48 and intersect the respective cavities 50. Four securing screws 42 are threadably engaged in the respective longitudinally disposed threaded apertures 62. The securing screws 42 engage the respective probe centering location finders 14 at their planar sectors 64 to prevent radial translation of the probe centering location finders 14 following radial adjustment by the adjustment screws 46. While the location finders 14 are independently adjustable using a micrometer, care is generally taken to make sure that the outer surface of each location finder is an equal radial distance from the centerline 13 of tool 10.

The knife holding portion 66 of the skiving section 58 is located directly aft of the cap 48 on the forward end of the skiving and roller burnishing tool 10. The knife holding portion 66 has a generally cylindrical outer surface and contains a polygonal (preferably rectangular) through aperture 30 which extends across the diameter of the knife holding portion 66. A plurality of roller bearings 40 are disposed on the various inner surfaces of the polygonal aperture 30. Knife holder 16 has a polygonal outer surface 17 and is conformed to fit within the polygonal aperture 30 in the knife holding portion 66. As the tool 10 rotates, the knife holder 16 floats on the plurality of roller bearings 40 and thus is able to center itself with respect to the centerline of tool 10.

In operation, the radial positions of probe centering location finders 14 are adjusted to fit the start diameter of work-piece 12 using adjustment screws 46. Once adjusted, the location finders 14 are fixed in place using securing screws 42. The skiving and roller burnishing tool 10 is then rotated and advanced through the hollow interior of work-piece 12 on a drive member 11. Location finders 14 hold the tool 10 on a precise line to provide a bore to very close tolerances, as low as a few thousandth's for a 22 foot bore. Coolant is pumped through the interior of the work-piece, and is channeled through the indentations on the sides of the skiving section proximate the skiving knives 26. The coolant directs the helical chips 24 formed by the skiving process forwardly and out the downstream end of the work-piece, typically in an unbroken pair of long coils which can exceed 100 feet in length. The chips 24 are shaped and further directed by the forwardly opening frustoconical indentations 56 in cap 48, minimizing the chance that the chip will become entangled on the location finders 14.

What is claimed is:

1. Apparatus for finishing the cylindrical interior of a hollow work-piece, comprising:

a rotatable skiving and roller burnishing tool adapted to advance through the cylindrical interior of the work-piece, said tool having a forward skiving section including a knife holding portion adapted to hold a skiving knife to skive the interior of the hollow work-piece from a start diameter to a larger, finish diameter, and a rearward roller burnishing section, the skiving section having a plurality of radially opening cavities disposed circumferentially about said skiving section in front of the location of the knife;

a plurality of probe centering location finders secured within the respective cavities and having outer surfaces having in combination a diameter approximately equal to the start diameter of the work-piece; and a plurality of actuators which independently adjust the radial position of each of the location finders to properly center the skiving and roller burnishing tool as it is advanced through the work-piece, wherein the plurality of probe centering location finders each include a radially disposed threaded aperture and wherein the plurality of actuators each include an adjustment screw threadably engaged in the respective threaded aperture and in contact with the base of the respective cavity to adjust the radial disposition of the plurality of probe centering location finders, and wherein the leading end of the skiving and roller burnishing tool further includes a plurality of laterally disposed threaded apertures intersecting the respective cavities, wherein the plurality of probe centering location finders each have a cylindrical configuration having planar sector, and wherein the plurality of actuators include securing screws threadably engaged in the respective laterally disposed apertures and engaging the respective probe centering location finders at the planar sectors to prevent radial translation of said finders following radial adjustment thereof with the adjustment screw.

2. The apparatus of claim 1 wherein the knife holding portion of the skiving section has a polygonal aperture having a plurality of inwardly directed roller bearings to allow the knife to move radially within the aperture.

3. The apparatus of claim 1 wherein the probe centering location finders are formed from an aluminum bronze alloy.

4. The apparatus of claim 1 wherein the laterally disposed threaded apertures are oriented in an axial direction parallel to an axis of the work-piece.

5. The apparatus of claim 1 wherein the radially disposed threaded apertures are provided on a common transverse plane.

6. The apparatus of claim 1 wherein the outer surfaces of the probe centering location finders have curvature closely approximating the curvature of the start diameter of the hollow interior of the work-piece.

7. The apparatus of claim 1 wherein the skiving portion of the skiving and roller burnishing tool includes a generally cylindrical cap at the leading end of said skiving section, and wherein the cavities are formed in the periphery of said cap.

8. The apparatus of claim 1 wherein the skiving section has a generally cylindrical outer configuration including a larger diameter circumferential portion immediately aft of the knife location, and a pair of longitudinal indentations on opposite sides of the skiving section proximate the knife locations, the larger diameter circumferential portion and the longitudinal indentations in combination acting to block the majority of coolant flow past the skiving section of the tool except through the indentations proximate the knife locations, to shape and direct the chip formed by the knife past the front of the skiving and roller burnishing tool and out the work-piece in the direction of translation of the skiving and roller burnishing tool.

9. The apparatus of claim 8 wherein the forward portions of the indentations in the outer surfaces of the skiving section have a forwardly opening frustoconical configuration forward of the knife location to further shape and direct the chip.

10. The apparatus of claim 9 wherein the plurality of probe centering location finders include two pairs of said finders, the finders of each pair being roughly 60 degrees apart from one another and the respective pairs being located in peripheral sections on opposite sides of the pair of indentations, and wherein the probe centering location finder closest to the leading edge of the peripheral section as the tool rotates is further from the edge of the peripheral section than the probe centering location finder nearest to the lagging edge of the peripheral section.

11. Apparatus for finishing the cylindrical interior of a hollow work-piece, comprising:

a rotatable skiving and roller burnishing tool adapted to advance through the cylindrical interior of the work-piece, said tool having a forward skiving section including a knife holding portion adapted to hold a skiving knife to skive the interior of the hollow work-piece from a start diameter to a larger, finish diameter, and a rearward roller burnishing section, the skiving section having a plurality of radially opening cavities disposed circumferentially about said skiving section in front of the location of the knife and a plurality of axially disposed threaded apertures intersecting the respective cavities;

a plurality of probe centering location finders located within the respective cavities, each said finder having a radially disposed threaded aperture;

a plurality of adjustment screws threadably engaged within the respective radially disposed apertures and bearing against the base of the respective cavities to establish the radial position of the respective probe centering location finders; and a plurality of securing screws disposed in the respective axially disposed threaded apertures to secure the radial position of the respective finders established by the adjustment screws, wherein the knife holding portion of the skiving section has a polygonal aperture having a plurality of inwardly directed roller bearings to allow the knife to move radially within the aperture.

12. The apparatus of claim 11 wherein the probe centering location finders are formed from an aluminum bronze alloy.

13. The apparatus of claim 11 wherein the skiving section has a generally cylindrical outer configuration including a larger diameter circumferential portion immediately aft of the knife location, and a pair of longitudinal indentations on opposite sides of the skiving section proximate the knife locations, the larger diameter circumferential portion and the longitudinal indentations in combination acting to block the majority of coolant flow past the skiving section of the tool except through the indentations proximate the knife locations, to shape and direct the chip formed by the knife past the front of the skiving and roller burnishing tool and out the work-piece in the direction of translation of the skiving and roller burnishing tool.

14. The apparatus of claim 13 wherein the forward portions of the indentations in the outer surfaces of the skiving section have a forwardly opening frustoconical configuration forward of the knife location to further shape and direct the chip.

15. The apparatus of claim 14 wherein the plurality of probe centering location finders include two pairs of said finders, the finders of each pair being roughly 60 degrees apart from one another and the respective pairs being located in peripheral sections on opposite sides of the pair of indentations, and wherein the probe centering location finder further from the leading edge of the peripheral section as the tool rotates is closer to the edge of the peripheral section than the probe centering location finder nearest to the lagging edge of the peripheral section.

16. The apparatus of claim 11 wherein each of the cavities has a cylindrical configuration, and wherein the probe centering location finders have a cylindrical lateral surface conformed to the configuration of the respective cavity and including a longitudinal planar sector, and wherein the securing screws bear against the planar sectors of the respective probe centering location finders.

17. Apparatus for finishing the cylindrical interior of a hollow work-piece, using a pair of oppositely disposed knife blades, said apparatus comprising:

a rotatable skiving and roller burnishing tool adapted to advance through the cylindrical interior of the work-piece, said tool having a forward skiving section and a rearward roller burnishing section, the skiving section having a knife holding portion which includes a polygonal aperture extending radially through the knife holding portion:

a plurality of roller bearings disposed on the inner surfaces of the polygonal aperture; and a polygonal knife holder disposed within and conformed to the polygonal aperture, so that the knife holder and the oppositely disposed knife blades attached thereto float axially within the knife holding portion of the skiving and roller burnishing tool on the roller bearings.

18. The apparatus of claim 17 wherein the polygonal aperture is rectangular in section, and the knife holder is correspondingly rectangular in section.

19. The apparatus of claim 17 wherein the skiving and roller burnishing tool includes a plurality of radially opening cavities disposed circumferentially about said skiving section in front of the location of the knife blades, and additionally comprising a plurality of probe centering location finders secured within the respective cavities and having outer surfaces having in combination a diameter approximately equal to the unskived diameter of the work-piece, and a plurality of actuators which independently adjust the radial position of each of the location finders to properly center the tool as it is advanced through the work-piece.

* * * * *